(12) United States Patent
Utsumi et al.

(10) Patent No.: US 7,309,936 B2
(45) Date of Patent: Dec. 18, 2007

(54) RESOLVER WITH WATERPROOFING ELEMENTS

(75) Inventors: Yoshinobu Utsumi, Tokyo (JP); Shinji Nishimura, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/101,551

(22) Filed: Apr. 8, 2005

(65) Prior Publication Data

US 2005/0280320 A1 Dec. 22, 2005

(30) Foreign Application Priority Data

Apr. 14, 2004 (JP) .............................. 2004-119018

(51) Int. Cl.
*H02K 11/00* (2006.01)
*H02K 5/10* (2006.01)

(52) U.S. Cl. .................... 310/71; 310/88; 310/71; 310/254; 310/68 B (58) Field of Classification Search ............... 310/43, 310/71, 88, 254, 68 B
See application file for complete search history.

(56) References Cited

U.S. PATENT DOCUMENTS

| | | | | |
|---|---|---|---|---|
| 4,545,369 A | * | 10/1985 | Sato | 600/133 |
| 5,773,906 A | * | 6/1998 | Mukai et al. | 310/232 |
| 5,818,123 A | * | 10/1998 | Iwasaki et al. | 307/42 |
| 5,982,056 A | * | 11/1999 | Koyama et al. | 310/43 |
| 6,028,383 A | * | 2/2000 | Ohshita | 310/71 |
| 6,392,322 B1 | * | 5/2002 | Mares et al. | 310/88 |
| 6,724,109 B2 | * | 4/2004 | Mimura | 310/71 |
| 2003/0030349 A1 | * | 2/2003 | Kobayashi et al. | 310/254 |
| 2003/0127921 A1 | | 7/2003 | Akutsu et al. | 310/68 R |
| 2003/0222531 A1 | | 12/2003 | Akutsu et al. | 310/218 |
| 2003/0230945 A1 | * | 12/2003 | Okubo et al. | 310/112 |
| 2004/0119350 A1 | * | 6/2004 | Miya et al. | 310/71 |
| 2005/0191121 A1 | * | 9/2005 | Gasaway et al. | 403/263 |

FOREIGN PATENT DOCUMENTS

| | | | |
|---|---|---|---|
| JP | 08-248049 | * | 9/1996 |
| JP | 08248049 | | 9/1996 |
| JP | 2001-330472 A | | 11/2001 |
| JP | 2002238230 A | * | 8/2002 |
| JP | 2002272050 A | * | 9/2002 |

* cited by examiner

*Primary Examiner*—Karl Tamai
(74) *Attorney, Agent, or Firm*—Sughrue Mion, PLLC

(57) ABSTRACT

To obtain a resolver in which the winding portion is prevented from breaking by corrosion caused by water. The resolver includes: a stator core in which a plurality of pole teeth are formed inside an annular stator core main body in a radius direction, a rotor provided inside the stator core; an insulator covering the pole teeth; a winding in which winding portions in each of which a wire is wound on each of the pole teeth through the insulator are connected with each other through a connecting wire; a winding connector including an external terminal electrically connected with the winding; and a waterproofing resin layer provided to cover the winding

12 Claims, 13 Drawing Sheets

RESOLVER WITH WATERPROOFING ELEMENTS

BACKGROUND OF THE INVENTION

1. Field of the Invention

The present invention relates to a resolver provided with winding portions having such a structure that a wire is would on each pole tooth of a stator core through an insulator.

2. Description of the Related Art

There has been known a conventional resolver having a simplified structure which is attained by providing a connector having connector pins in an insulating cover of an annular stator core, and by allowing an external connector to be directly detachably attached to the connector to thereby dispense with a connector with a lead wire (for example, see JP 2001-330472 A).

However, in the above-mentioned resolver, a winding portion provided in each pole tooth of the stator core is not waterproofed. Therefore, for example, the winding portion is liable to break because of corrosion caused by water.

In addition, a waterproofing mechanism is not provided for the connector, so water may invade into an inner portion through the connector pins Therefore, as in the case of the above, the winding portion is liable to break because of the corrosion caused by water.

SUMMARY OF THE INVENTION

The present invention has been made to solve the above-mentioned problems. An object of the present invention is to obtain a resolver capable of preventing breakage of the winding portion by corrosion caused by water.

A resolver according to the present invention includes; a stator core in which a plurality of pole teeth are formed inside an annular stator core main body in a radius direction; a rotor provided inside the stator core; an insulator covering the pole teeth; a winding in which winding portions in each of which a wire is wound on each of the pole teeth through the insulator are connected with each other through a connecting wire; a winding connector including an external terminal electrically connected with the winding; and a waterproofing resin layer provided to cover the winding.

According to the resolver of the present invention, the winding portion can be prevented from breaking by the corrosion caused by water.

DESCRIPTION OF PREFERRED EMBODIMENTS

Hereinafter, embodiments of the present invention will be described with reference to the accompanying drawings. In each of the drawings, the same references are provided for the same or equivalent members or portions.

Embodiment 1

Figure 1:
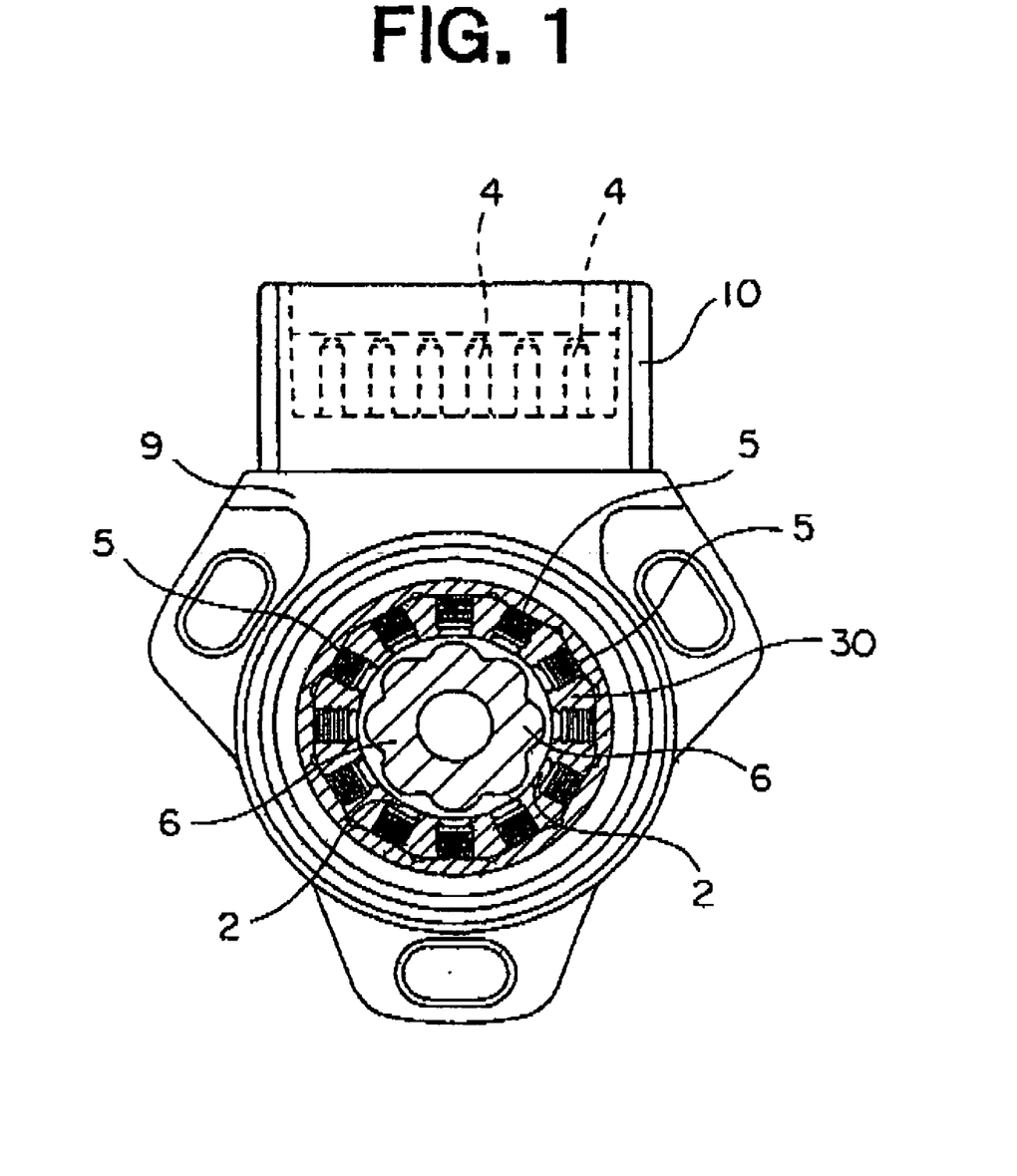
FIG. 1 is a front view showing a resolver according to Embodiment 1 of the present invention.
Figure 2:
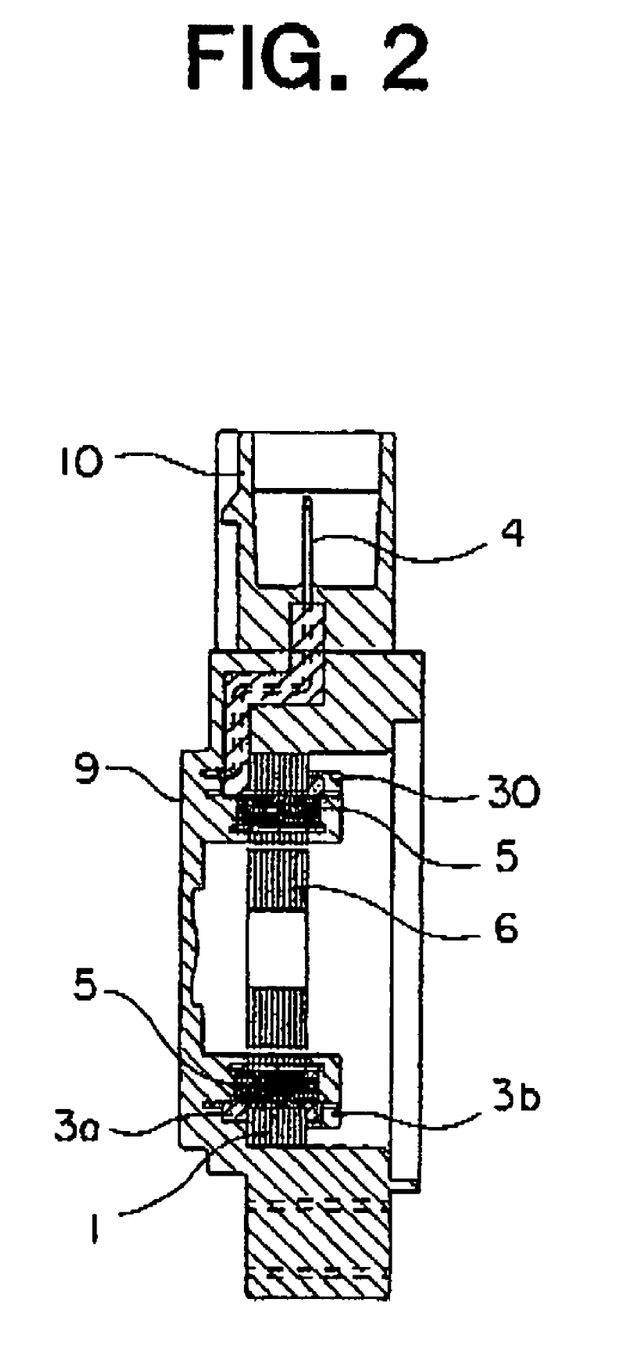
FIG. 2 is a side sectional view showing the resolver shown in FIG. 1.

FIG. 1 is a front view showing a resolver according to Embodiment 1 of the present invention. FIG. 2 is a side sectional view showing the resolver shown in FIG. 1.

In the resolver, a stator core having thin silicon steel plates stacked thereon includes an annular stator core main body 1 and a plurality of pole teeth 2 formed inside the stator core main body 1 in a radius direction. The pole teeth 2 are covered with an insulator. The insulator includes a first insulator portion 3a and a second insulator portion 3b. The first insulator portion 3a is composed of an annular main body and a support portion that extends from the main body to an outside in the radius direction and is integrally formed with external terminals 4 by insert molding. The second insulator portion 3b is annularly formed and bonded to the main body of the first insulator portion 3a. The insulator is made of polybutylene terephthalate (PBT) and formed by injection molding A winding portion 5 is provided in each of the pole teeth 2 through the insulator. In the winding portion 5, wire is wound plural turns on the pole tooth 2. The adjacent winding portions 5 are connected with each other through a connecting wire to construct a winding. The winding is covered with a waterproofing resin layer 30.

A rotor 6 which is fixed to a shaft of a motor and that rotates with the rotation of the shaft is provided on a central axis line of the stator core.

Figure 3:
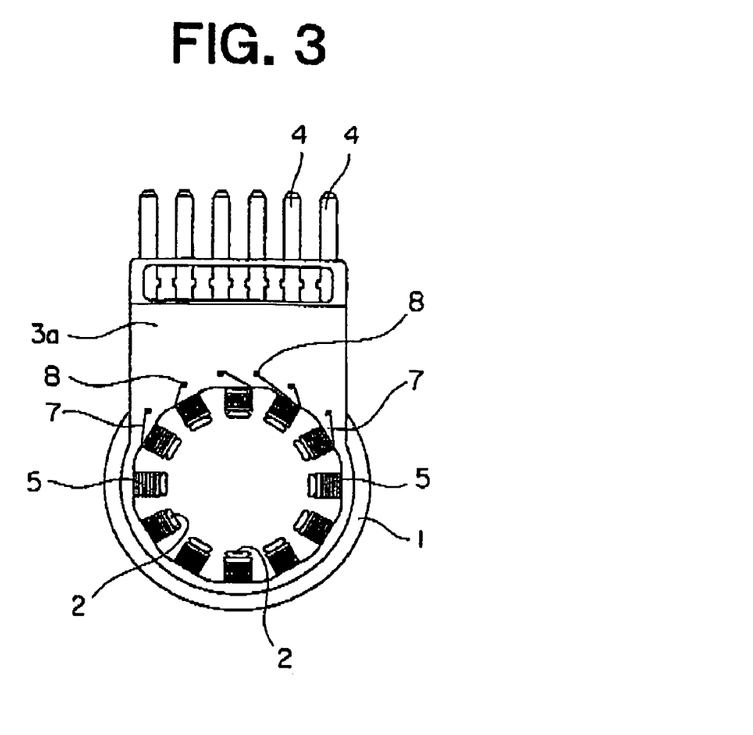
FIG. 3 is a front view showing a semifinished product of the resolver shown in FIG. 1.
Figure 4:
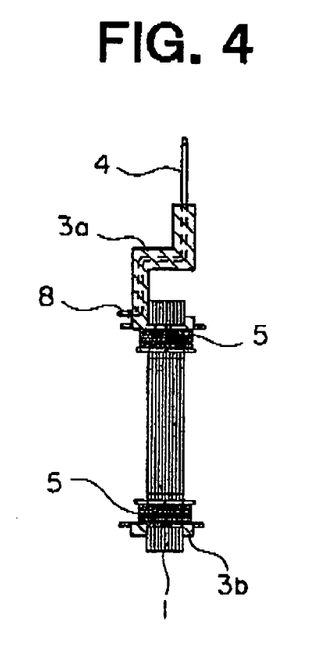
FIG. 4 is a side sectional view showing the semifinished product shown in FIG. 3.

FIG. 3 is a front view showing a semifinished product before the resolver is manufactured by insert molding. FIG. 4 is a side sectional view showing the semifinished product shown in FIG. 3

A lead wire 7 is extended from each of the winding portions 5 to a base end side of each of the external terminals 4. A tip portion of the lead wire 7 is connected with a pin 8 set in the base end. In the semifinished product, a case 9 (see FIG. 1) and a winding connector 10 having the external terminals 4 are formed by insert molding.

Next, a procedure for manufacturing the resolver having the above-mentioned structure will be described.

First, the first insulator portion 3a and the second insulator portion 3b are fit to both surfaces of the stator core. After that, wire is wound plural turns on each of the pole teeth 2 through the insulator to provide the winding portion 5. Next, the tip portion of the lead wire 7 of the winding portion 5 is connected with the pin 8 to produce the semifinished product.

Finally, the case 9 and the winding connector 10 are formed in the semifinished product by insert molding and simultaneously the winding is covered with the resin layer 30.

According to the resolver in Embodiment 1, the winding is covered with the waterproofing resin layer 30. Therefore, the winding can be prevented from breaking by corrosion caused by water

Embodiment 2

Figure 5:
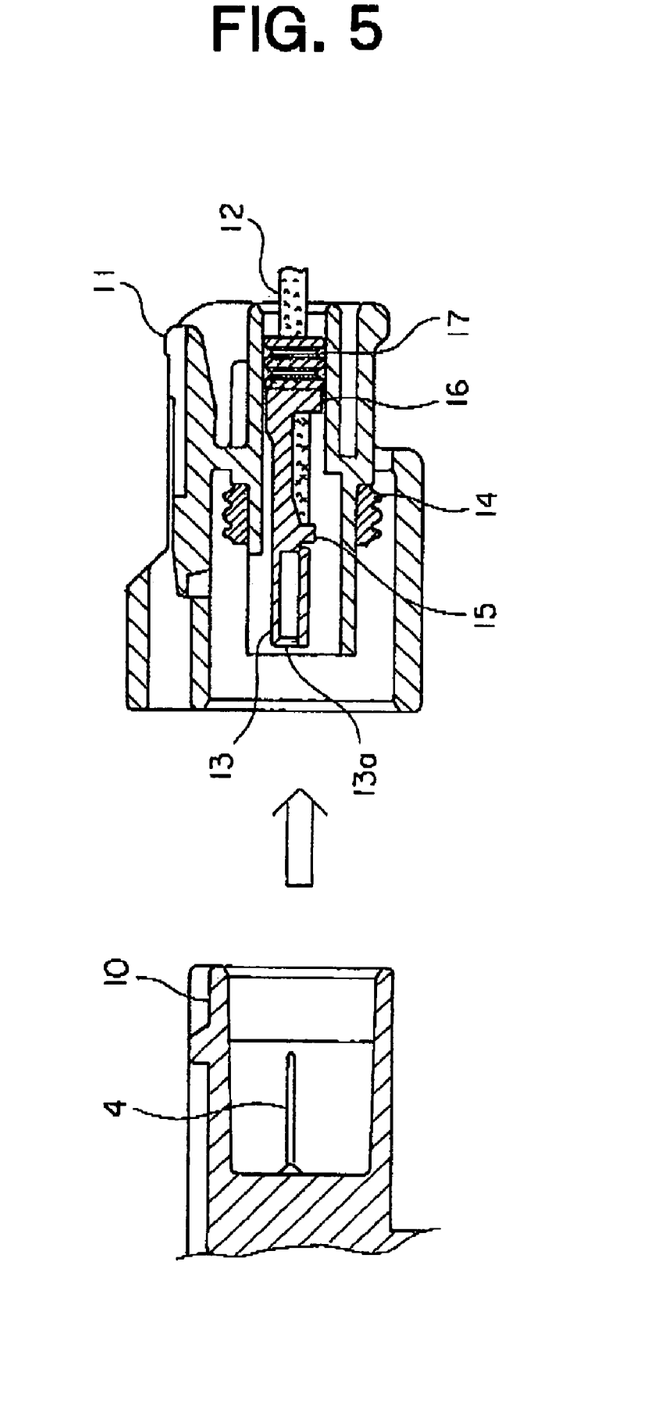
FIG. 5 is a side sectional view showing a winding connector and a waterproofed connector in a resolver according to Embodiment 2 of the present invention before they are connected with each other.

FIG. 5 is a sectional view showing a waterproofed connector 11 serving as a constituent element of a resolver according to Embodiment 2.

In this embodiment, the winding connector 10 shown in Embodiment 1 is inserted into the waterproofed connector 11.

The waterproofed connector 11 includes: internal terminals 13 into which the external terminals 4 are inserted and which are electrically connected with lead wires 12; and a seal 14 which is made of rubber and used to prevent water from invading into an inner portion of the winding connector 10. The internal terminals 13 are connected with ends of the lead wires 12 in caulking portions 15 and 16. A seal 17 made of rubber is provided for the lead wires 12 and located adjacent to the caulking portion 16.

Figure 6:
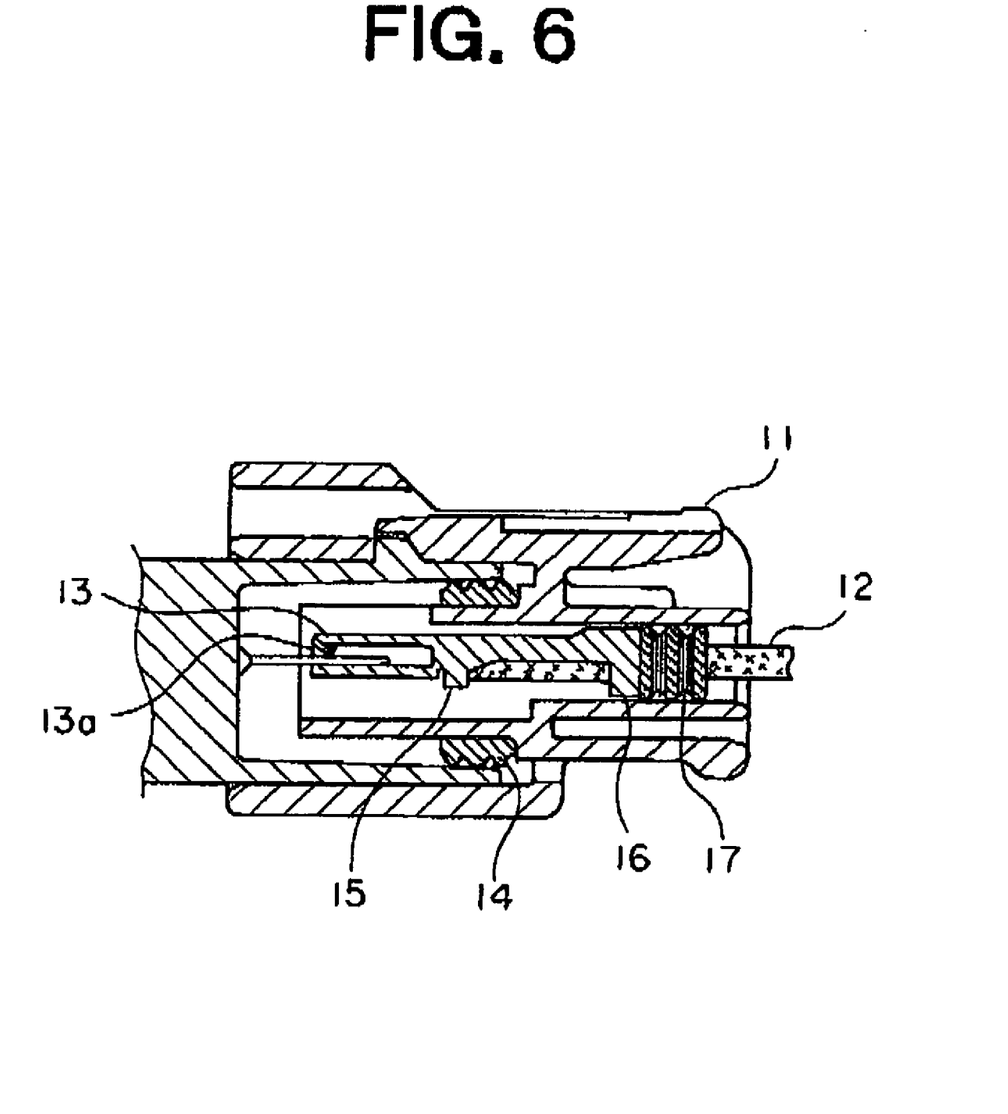
FIG. 6 is a side sectional view showing the winding connector and the waterproofed connector in FIG. 5 when they are connected with each other.

As shown in FIG. 6, tip portions of each of the internal terminals 13 are openable and closable and elastically in contact with the external terminals 4 when they are inserted into the internal terminals 13 At this time, the seal 14 is elastically in contact with an inner wall surface of the winding connector 10.

According to the resolver in Embodiment 2, the waterproofed connector 11 is provided for the winding connector 10. Therefore, water is surely prevented from invading into the inner portion of the resolver through the winding connector 10 by the seals 14 and 17.

Embodiment 3

Figure 7:
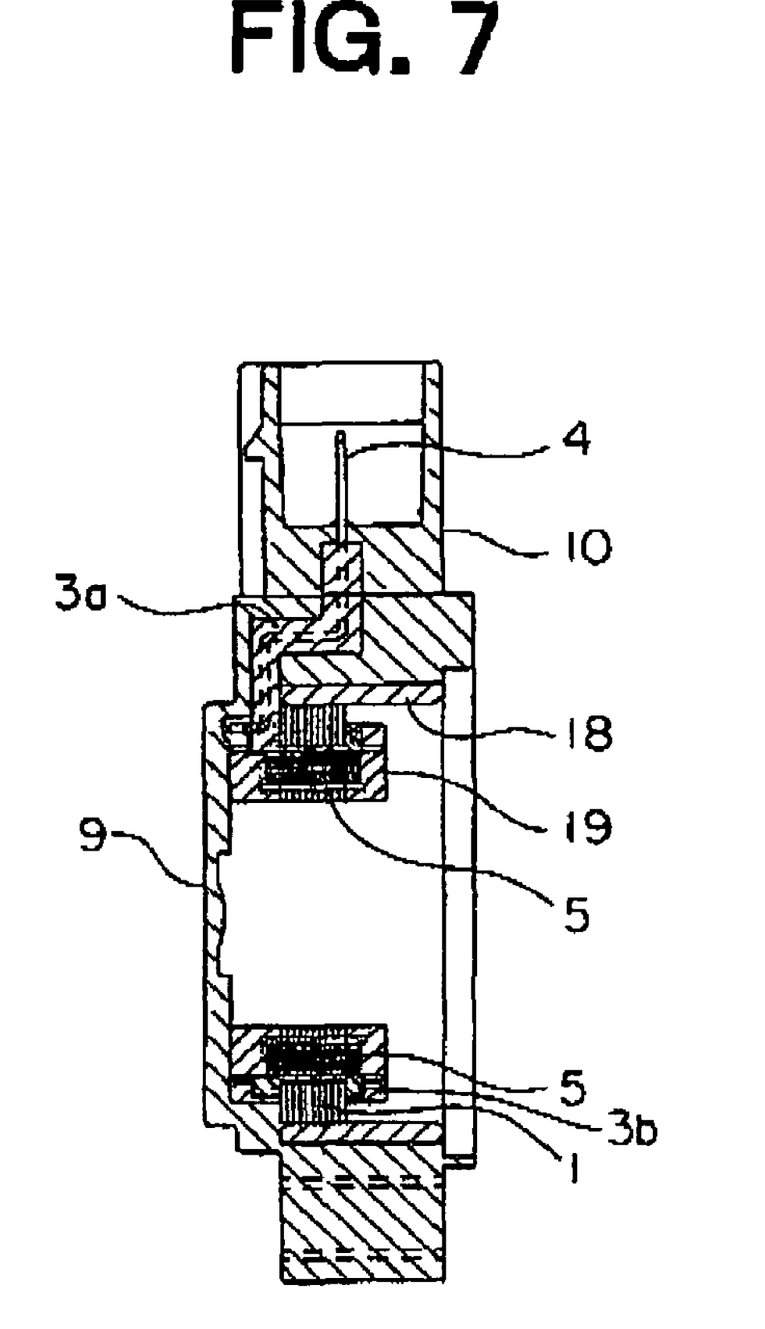
FIG. 7 is a side sectional view showing a resolver according to Embodiment 3 of the present invention.
Figure 8:
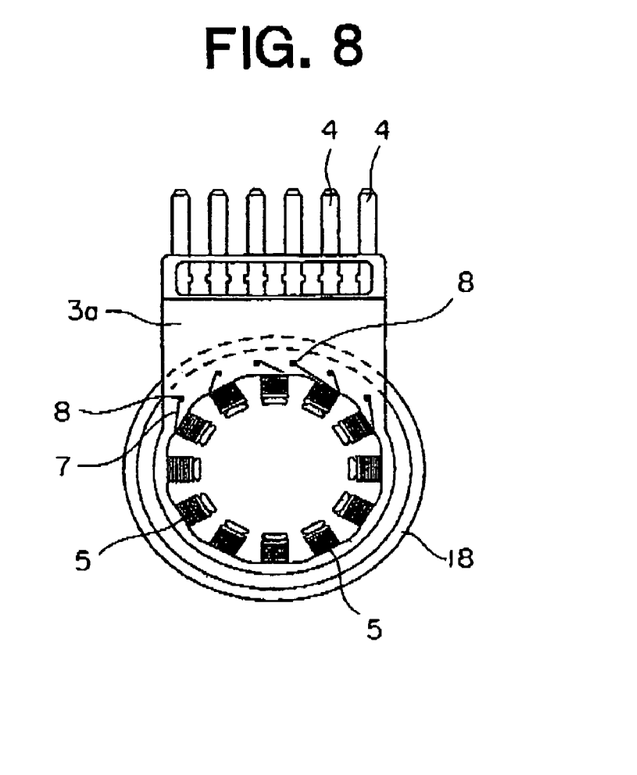
FIG. 8 is a front view showing a semifinished product of the resolver shown in FIG. 7.
Figure 9:
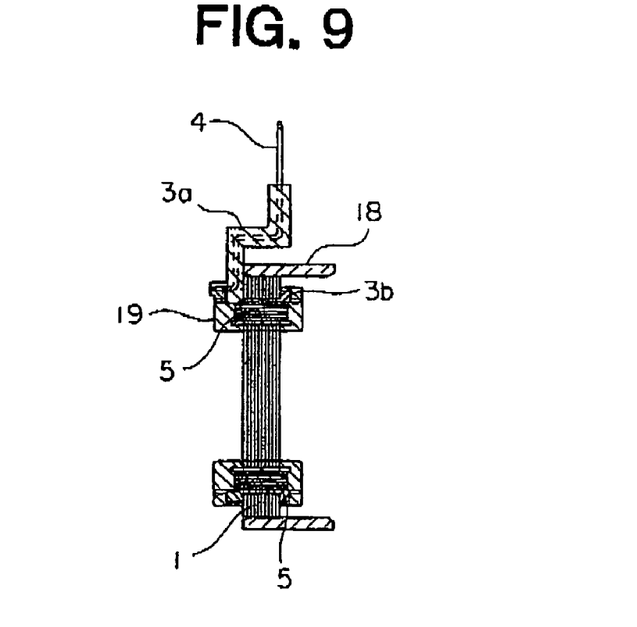
FIG. 9 is a side sectional view showing the semifinished product shown in FIG. 8 in which a low-pressure protective layer is formed.

FIG. 7 is a side sectional view showing a resolver according to Embodiment 3 of the present invention. FIG. 8 is a front view showing a semifinished product of the resolver shown in FIG. 7. FIG. 9 is a side sectional view showing the semifinished product of the resolver as shown in FIG. 8 in which a low-pressure protective layer 19 serving as a resin layer is formed.

In this embodiment, an annular ring 18 for aligning an axial center of the stator core main body 1 with an axial center of the rotor 6 which is fixed to the shaft of the motor is fit onto an outer circumferential surface of the stator core main body 1.

The low-pressure protective layer 19 made of an epoxy resin is formed to cover the entire winding. Before the case 9 and the winding connector 10 are formed in the semifinished product by insert molding at an injection molding pressure, the low-pressure protective layer 19 is formed by injection molding at an injection molding pressure lower than the injection molding pressure According to such a resolver, the annular ring 18 is fit to a bracket of the motor. Therefore, the axial center of the stator core main body 1 can be aligned with the axial center of the rotor 6 without adjustment.

Because the low-pressure protective layer 19 is formed at a pressure lower than the injection molding pressure at which the case 9 and the winding connector 10 are formed by insert molding, it is possible to prevent a disadvantage such as a break of the winding due to the application of a high injection molding pressure.

Note that, instead of covering the winding with the low-pressure protective layer 19, the winding may be impregnated with varnish to cover the winding with a protective layer made of vanish.

Embodiment 4

Figure 10:
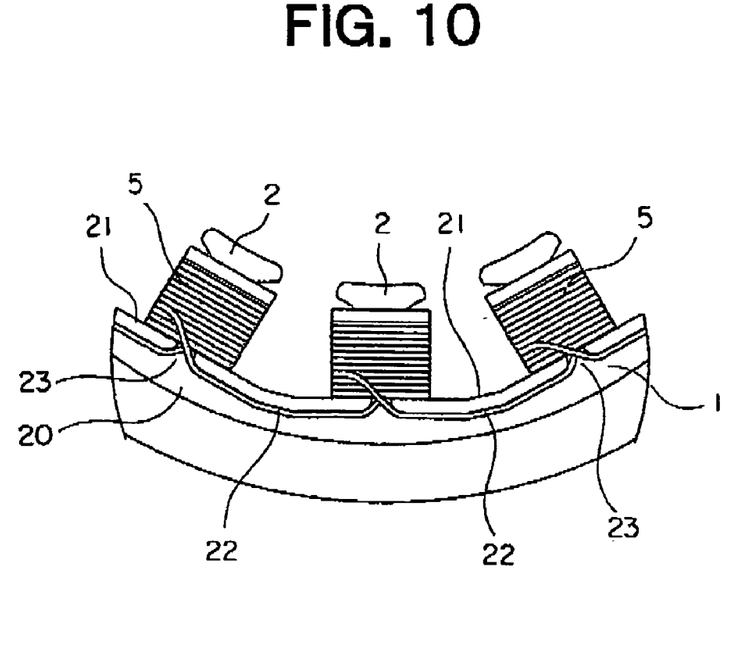
FIG. 10 is a main part front view showing a semifinished product of a resolver according to Embodiment 4 of the present invention.
Figure 11:
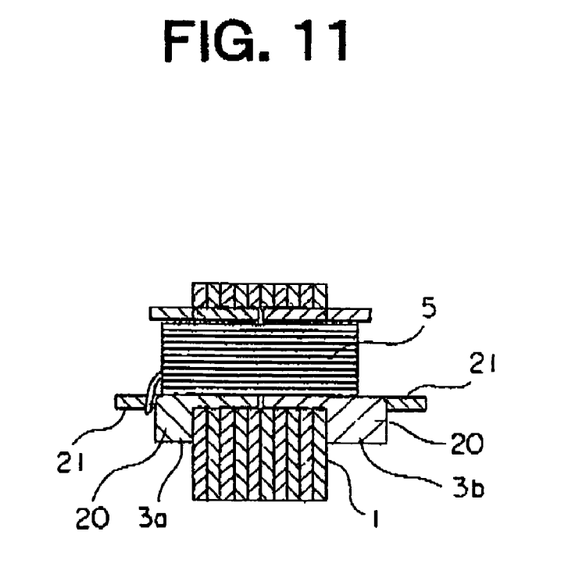
FIG. 11 is a side sectional view showing the semifinished product shown in FIG. 10.

FIG. 10 is a main part front view showing a semifinished product of a resolver according to Embodiment 4 of the present invention FIG. 11 is a side sectional view showing the semifinished product shown in FIG. 10.

In this embodiment, a plurality of walls 21 for connecting wire that extend in a circumferential direction are formed at intervals in a connecting portion 20 of the insulator formed over the entire inner circumferential side of the stator core main body 1. Connecting wires 22 for connecting between the adjacent winding portions 5 are provided along the walls 21 for connecting wire. Each of the connecting wires 22 extends and protrudes through a groove 23 between the adjacent walls 21 for connecting wire According to such a resolver, the walls 21 for connecting wire are formed in the connecting portion 20 of the insulator. Therefore, when the case 9 and the winding connector 10 are formed by insert molding, the injection molding pressure applied to the respective winding portions 5 is reduced by the walls 21 for connecting wire.

Each of the connecting wires 22 protrudes through the groove 23 formed in a width region of the pole tooth 2 in the circumferential direction and extends to the adjacent winding portion 5 along the wall 21 for connecting wire. Therefore, the connecting wires 22 do not exist in the air, so that they are resistant to break at the injection molding pressure for the above-mentioned insert molding

Embodiment 5

Figure 12:
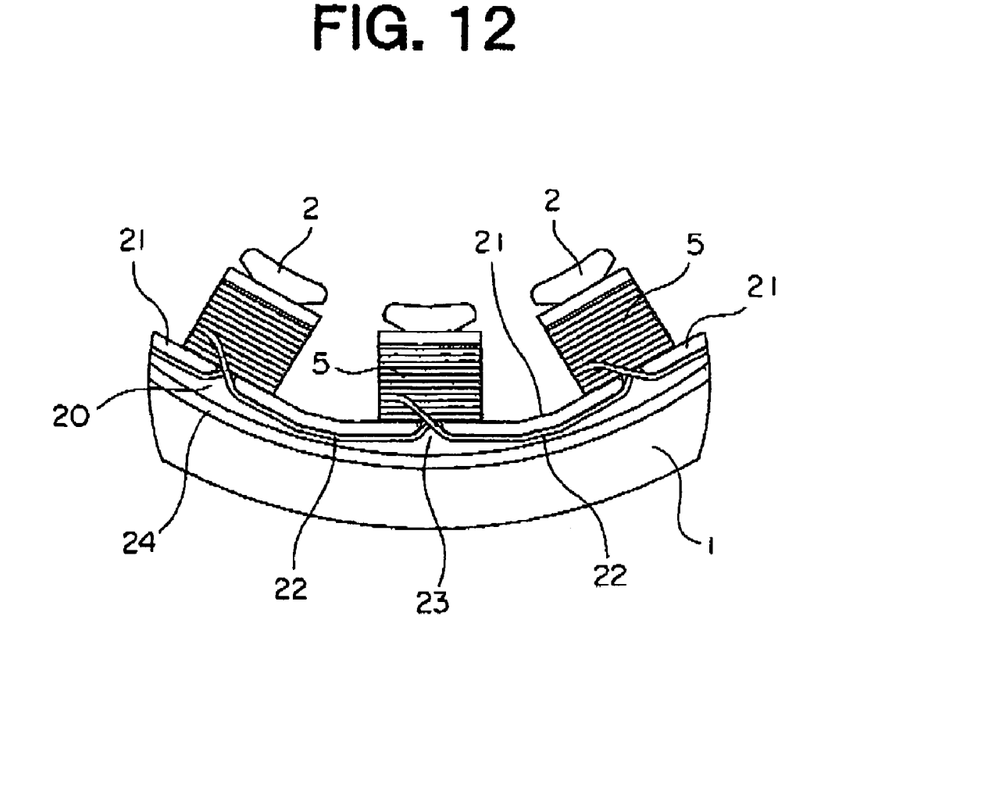
FIG. 12 is a main part front view showing a semifinished product of a resolver according to Embodiment 5 of the present invention.
Figure 13:
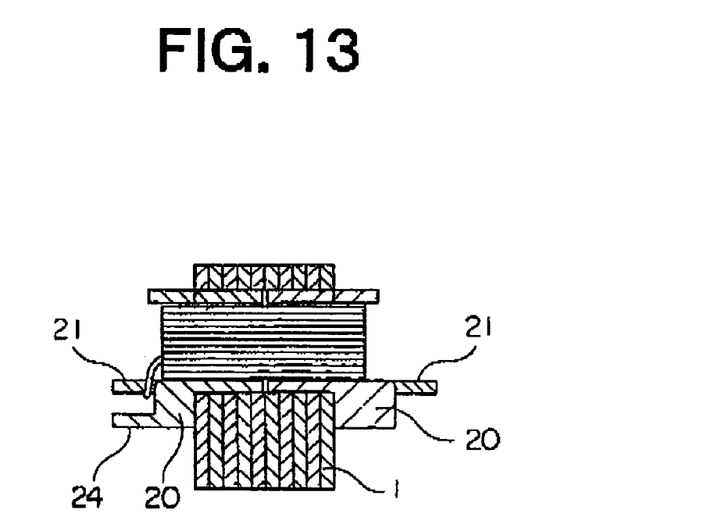
FIG. 13 is a side sectional view showing the semifinished product shown in FIG. 12.

FIG. 12 is a main part front view showing a semifinished product of a resolver according to Embodiment 5 of the present invention. FIG. 13 Is a side sectional view showing the semifinished product shown in FIG. 12.

In this embodiment, a protective wall 24 which is located outside the walls 21 for connecting wire in the radius direction and that extends in the circumferential direction is formed over the entire circumference.

According to such a resolver, the protective wall 24 is formed in addition to the walls 21 for connecting wire. Therefore, the injection molding pressure applied to the winding portions 5 at the time of injection molding is further reduced as compared with the resolver according to Embodiment 3.

Embodiment 6

Figure 14:
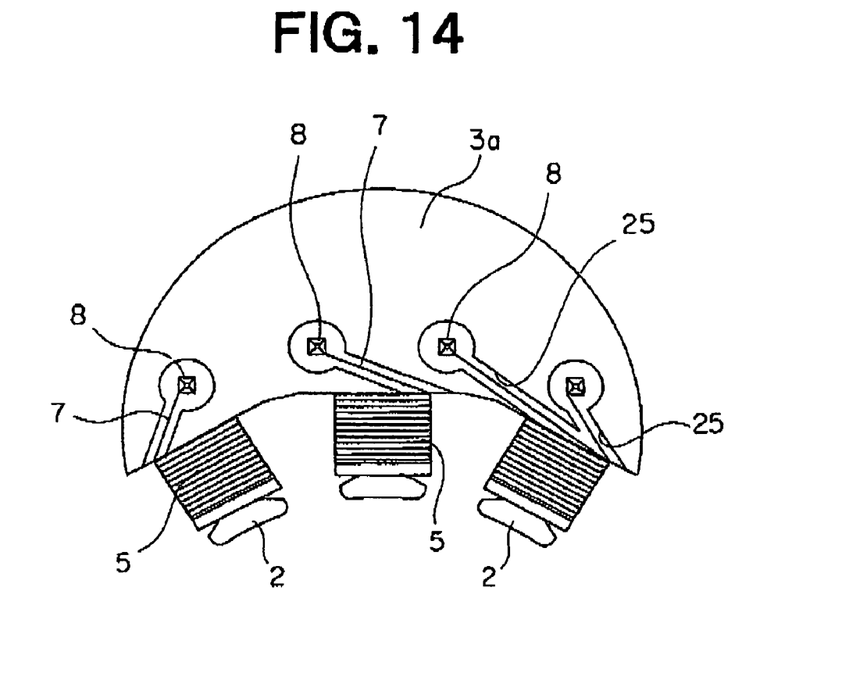
FIG. 14 is a main part front view showing a semifinished product of a resolver according to Embodiment 6 of the present invention.

FIG. 14 is a main part front view showing a semifinished product of a resolver according to Embodiment 6 of the present invention.

In this embodiment, the pin 8 set in the base end of each of the external terminals 4 is connected with the tip portion of the lead wire 7 extended from each of the winding portions 5. In the first insulator portion 3a, a groove 25 for lead wire is formed along the lead wire 7

According to such a resolver, each of the lead wires 7 extends along the groove 25 for lead wire. Therefore, the lead wires 7 do not exist in the air, so that they are resistant to break at the injection molding pressure for the above-mentioned insert molding.

Embodiment 7

Figure 15:
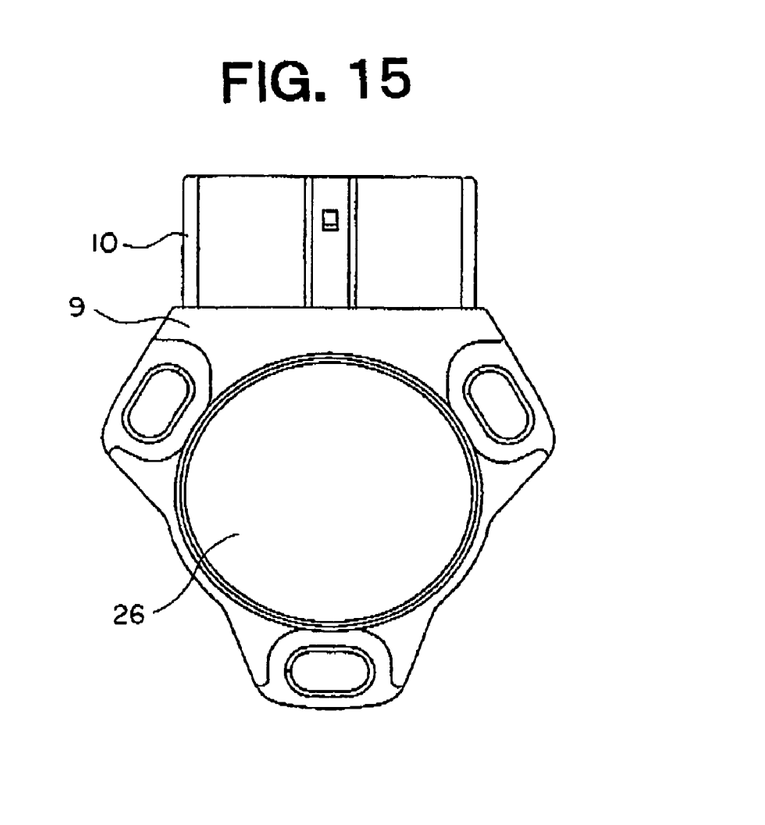
FIG. 15 is a front view showing a resolver according to Embodiment 7 of the present invention.
Figure 16:
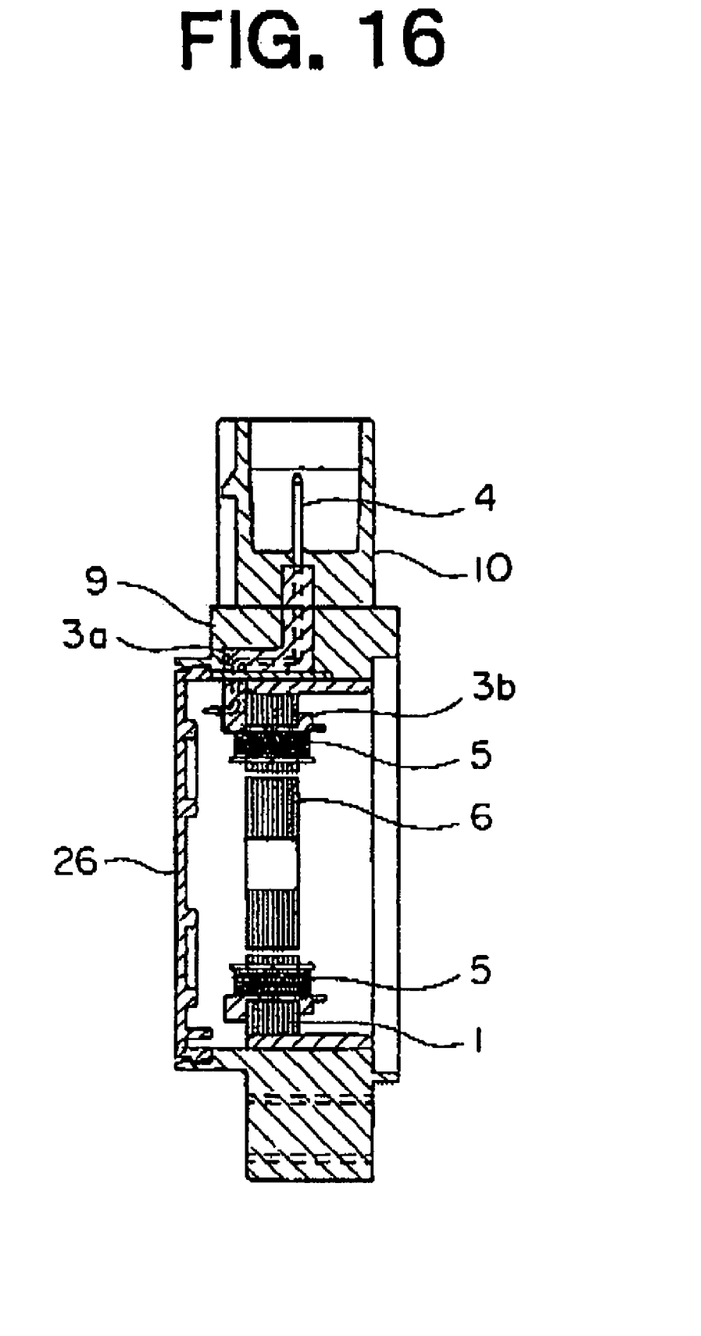
FIG. 16 is a side sectional view showing the resolver shown in FIG. 15.

FIG. 15 is a front view showing a resolver according to Embodiment 7 of the present invention. FIG. 16 is a side sectional view showing the resolver shown in FIG. 15.

In this embodiment, the stator core, the insulator, the rotor 6, and the winding are covered with a cover 26 on an opposite side to the bracket of the motor to which a resolver main body having the stator core, the insulator, and the winding is fixed and on one side of the resolver main body.

According to such a resolver, the cover 26 is provided. Therefore, it is unnecessary to form the resin layer 30 for waterproofing the winding described in Embodiment 1. When the resolver main body is fit to the bracket of the motor, water can be prevented from invading into the inner portion of the resolver by the cover 26. Embodiment 8

Figure 17:
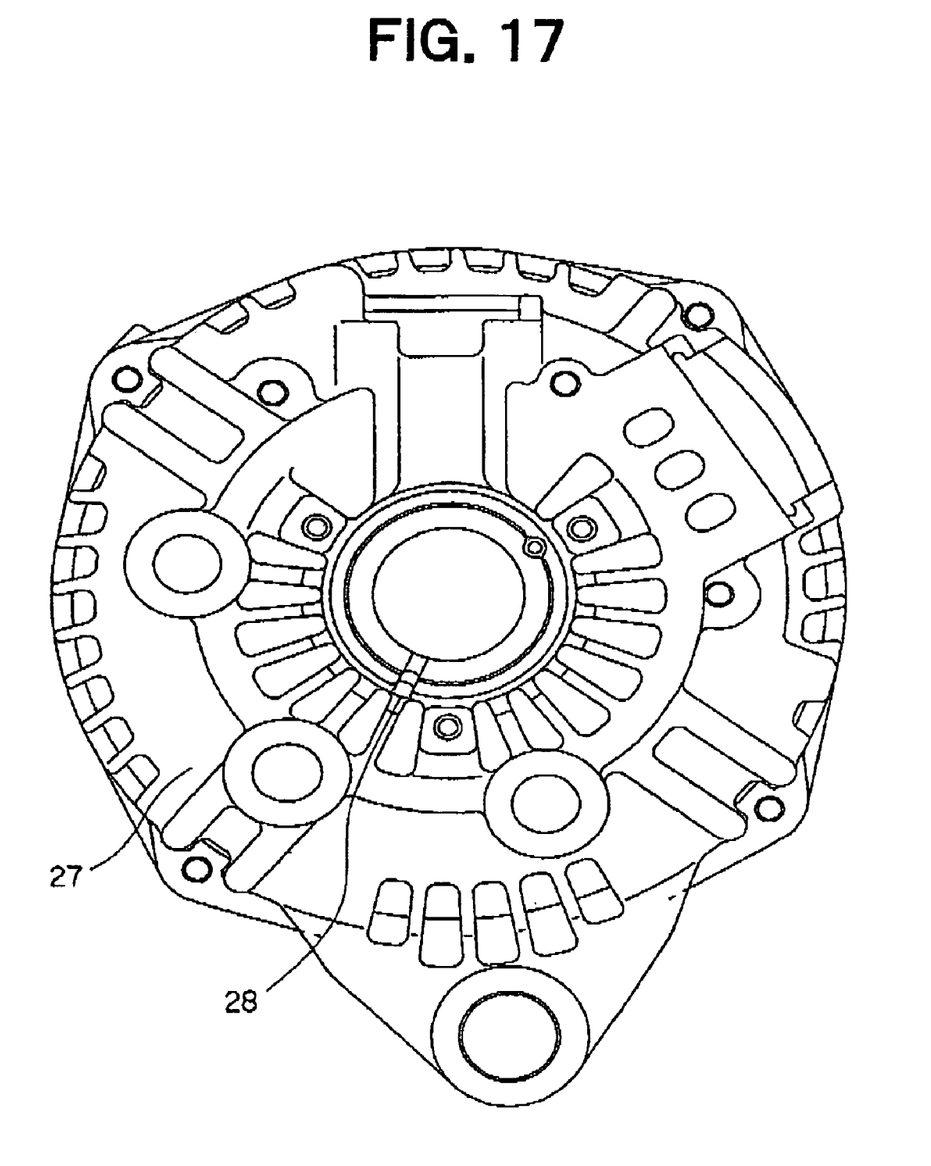
FIG. 17 is a front view showing a motor to which the resolver according to Embodiment 8 of the present invention is to be fit.
Figure 18:
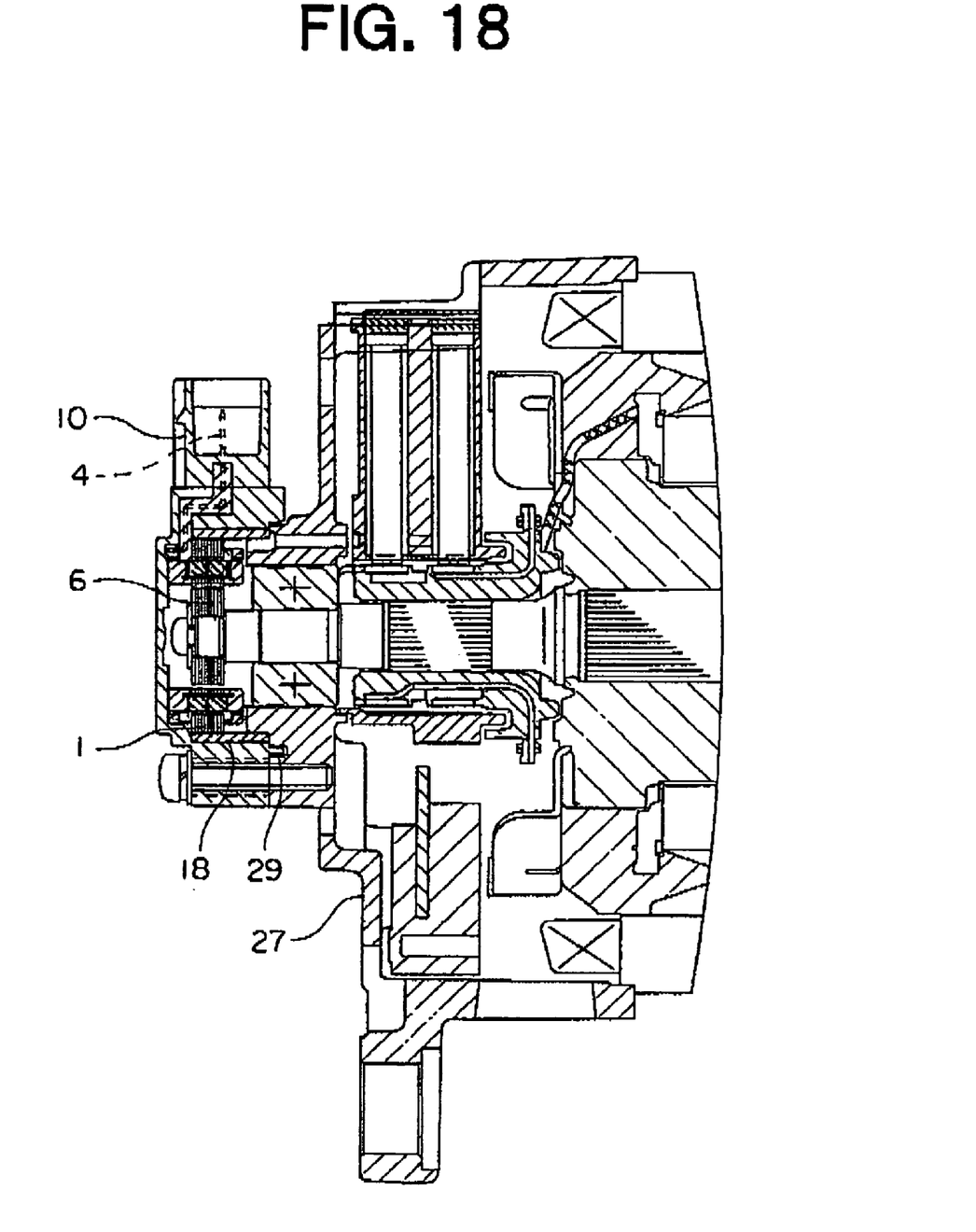
FIG. 18 is a main part side sectional view showing the motor shown in FIG. 17 whose bracket is fit to the resolver according to Embodiment 8.

FIG. 17 is a front view showing a motor before the resolver according to Embodiment 7 of the present invention is fit to the motor. FIG. 18 is a partial side sectional view showing the motor shown in FIG. 17 to which the resolver is fit.

In this embodiment, a drain groove 28 is provided on a surface of the resolver which is bonded to a bracket 27 of the motor A labyrinth structure 29 is provided on the surface of the resolver which is bonded to the bracket 27.

According to such a resolver, because the labyrinth structure 29 is provided on the surface of the resolver which is bonded to the bracket 27, sealing property between the bracket 27 and the resolver is ensured.

What is claimed is:

1. A resolver, comprising:
a stator core in which a plurality of pole teeth are formed inside an annular stator core main body in a radius direction;
a rotor provided inside the stator core;
an insulator covering the pole teeth;
a winding in which winding portions in each of which a wire is wound on each of the pole teeth through the insulator are connected with each other through a connecting wire;
a winding connector including an external terminal electrically connected with the winding; and
a waterproofing resin layer provided to cover the winding;
wherein the insulator comprises a connecting portion formed over an entire inner circumferential side of the stator core main body and a plurality of walls for connecting wire that extend in a circumferential direction which are formed at intervals in the connecting portion;
wherein the connecting wire extends along the walls for connecting wire; and wherein the insulator further comprises a groove which is located between the adjacent walls for connecting wire and formed in a width region of each of the pole tooth in the circumferential direction.

2. A resolver, comprising:
a stator core in which a plurality of pole teeth are formed inside an annular stator core main body in a radius direction;
a rotor provided inside the stator core;
an insulator covering the pole teeth;
a winding in which winding portions in each of which a wire is wound on each of the pole teeth through the insulator are connected with each other through a connecting wire;
a winding connector including an external terminal electrically connected with the winding; and
a waterproofed connector connected with the winding connector,
wherein the waterproofed connector comprises an internal terminal into which the external terminal is inserted and which are electrically connected with an external lead wire and a seal for preventing water from invading into an inner portion of the winding connector;
wherein the insulator comprises a connecting portion formed over an entire inner circumferential side of the stator core main body and a plurality of walls for connecting wire that extend in a circumferential direction which are formed at intervals in the connecting portion;
wherein the connecting wire extends along the walls for connecting wire; and
wherein the insulator further comprises a groove which is located between the adjacent walls for connecting wire and formed in a width region of each of the pole tooth in the circumferential direction.

3. A resolver according to claim 2, further comprising a waterproofing resin layer covering the winding.

4. A resolver according to claim 2, further comprising a cover for covering and waterproofing the stator core, the insulator, the rotor, and the winding on an opposite side to a bracket of a motor to which a resolver main body composed of the stator core, the insulator, and the winding is fixed and on a side of the resolver main body.

5. A resolver according to claim 2, wherein the waterproofing resin layer comprises a low-pressure protective layer formed at an injection molding pressure lower than an injection molding pressure at which the winding connector is formed by insert molding.

6. A resolver, comprising:
a stator core in which a plurality of pole teeth are formed inside an annular stator core main body in a radius direction;
a rotor provided inside the stator core;
an insulator covering the pole teeth;
a winding in which winding portions in each of which a wire is wound on each of the pole teeth through the insulator are connected with each other through a connecting wire; and a cover for covering and waterproofing the stator core, the insulator, the rotor, and the winding on an opposite side to a bracket of a motor to which a resolver main body composed of the stator core, the insulator, and the winding is fixed and on a side of the resolver main body;

wherein the insulator comprises a connecting portion formed over an entire inner circumferential side of the stator core main body and a plurality of walls for connecting wire that extend in a circumferential direction which are formed at intervals in the connecting portion;

wherein the connecting wire extends alone the walls for connecting wire; and wherein the insulator further comprises a groove which is located between the adjacent walls for connecting wire and formed in a width region of each of the pole tooth in the circumferential direction.

7. A resolver according to claim 6, further comprising an annular ring for aligning an axial center of the stator core main body with an axial center of the rotor which is fixed to a shaft of a motor, the annular ring being fit onto an outer circumferential surface of the stator core main body.

8. A resolver according to claim 6, wherein the waterproofing resin layer is formed by impregnating the winding with varnish.

9. A resolver according to claim 6, wherein the insulator comprises a connecting portion formed over an entire inner circumferential side of the stator core main body and a plurality of walls for connecting wire that extend in a circumferential direction which are formed at intervals in the connecting portion, and the connecting wire extends along the walls for connecting wire.

10. A resolver according to claim 9, wherein the insulator further comprises a protective wall which is formed in the connecting portion, which is located outside the walls for connecting wire in the radius direction, and which extends in the circumferential direction and the protective wall is formed to reduce an injection molding pressure applied to the winding in molding.

11. A resolver according to claim 6, wherein the insulator comprises a groove for lead wire which is formed between a base end of the external terminal and the winding and the winding comprises a lead wire that extends along the groove for lead wire and which is electrically connected with the base end.

12. A resolver according to claim 6, further comprising a labyrinth structure which is provided on a surface of the resolver which is bonded to a bracket of a motor.

* * * * *